(12) United States Patent
Barnas et al.

(10) Patent No.: US 6,642,838 B1
(45) Date of Patent: Nov. 4, 2003

(54) SAFETY SYSTEM FOR AUTOMOBILES

(76) Inventors: Charles A. Barnas, 3528 Powder Keg Dr., Evans, CO (US) 80620; Linda Barnas, 3528 Powder Keg Dr., Evans, CO (US) 80620

( * ) Notice: Subject to any disclaimer, the term of this patent is extended or adjusted under 35 U.S.C. 154(b) by 0 days.

(21) Appl. No.: 10/283,786

(22) Filed: Oct. 31, 2002

(51) Int. Cl.$^7$ .................................................. B60Q 1/00
(52) U.S. Cl. ............................ 340/425.5; 340/573.1; 340/426.29
(58) Field of Search .......................... 340/425.5, 573.1, 340/426.18, 426.22, 426.28, 426.29, 438, 464, 539.1; 62/126, 127, 129, 178

(56) References Cited

U.S. PATENT DOCUMENTS

| | | | |
|---|---|---|---|
| 3,688,256 A | 8/1972 | D'Ausilio et al. ............ 340/63 |
| 3,728,615 A | 4/1973 | Hill et al. ...................... 324/33 |
| 4,353,218 A | * 10/1982 | Wheatley et al. ................. 62/6 |
| 4,638,294 A | 1/1987 | Sakurai ......................... 340/63 |
| 4,924,418 A | 5/1990 | Bachman et al. ............ 364/550 |
| 5,027,104 A | 6/1991 | Reid ........................... 340/541 |
| 5,576,739 A | 11/1996 | Murphy ................. 340/825.06 |
| 5,739,756 A | 4/1998 | Margulies .................... 340/632 |
| 6,104,293 A | * 8/2000 | Rossi ....................... 340/573.1 |
| 6,448,888 B1 | * 9/2002 | Horner et al. ........... 340/425.5 |

* cited by examiner

Primary Examiner—Daniel J. Wu
Assistant Examiner—Phung T Nguyen
(74) Attorney, Agent, or Firm—Donald R. Schoonover

(57) ABSTRACT

A system detects the presence of an occupant in a land vehicle after the engine of the land vehicle has been turned off. The system activates an alarm and a cooling system as well as unlocks the doors of the vehicle. Thus, help can be notified and the temperature of the vehicle near the occupant can be maintained cool until help arrives. A GPS system can be included in some forms of the invention as well as a plurality of different alarms.

5 Claims, 1 Drawing Sheet

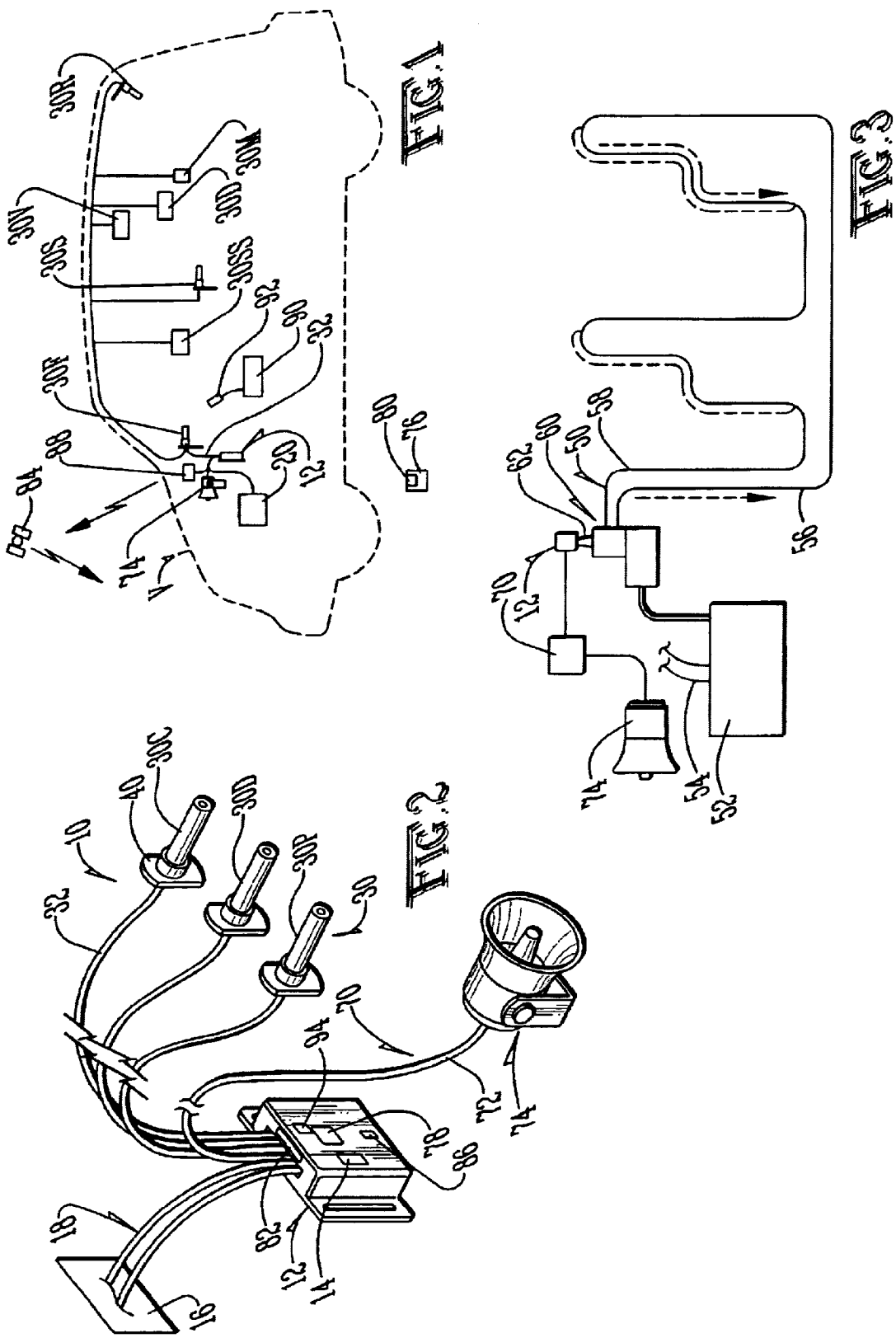

SAFETY SYSTEM FOR AUTOMOBILES

BACKGROUND OF THE INVENTION

1. Field of the Invention

The present invention relates to the general art of land vehicles, and to the particular field of accessories for land vehicles.

2. Discussion of the Related Art

The dangers associated with leaving children, elderly adults, and pets in a parked vehicle have been well documented. The fact that the temperature inside a vehicle parked in the sun rapidly increases to frighteningly high levels has also been well documented. These heat levels frequently exceed levels that are considered to be dangerous to living beings.

Accordingly, there is a need for a system that protects people and animals in a vehicle from overheating.

While the art contains disclosures of various alarm systems, these systems have several drawbacks.

For example, even if a person's presence is detected and an alarm activated, it may be several minutes before help arrives. In some cases, a delay of several minutes can be very undesirable. This is especially true if the vehicle is in a remote location. In fact, if the location is sufficiently remote, and the alarm system consists merely of sounding the vehicle's horn, it is possible that no one will hear the alarm.

Therefore, there is a need for a system which not only detects the presence of an occupant in a vehicle, but also alerts help in a manner which permits expeditious rescue.

More specifically, there is a need for a system which not only detects the presence of an occupant in a vehicle, but also alerts help in a manner which permits expeditious rescue even if help is initially far remote from the vehicle.

Still further, if the vehicle is in a remote location, help in the form of a rescue squad may have difficulty in even finding the vehicle.

Therefore, there is need for a system which not only detects the presence of an occupant in a vehicle but also is capable of guiding that help to the vehicle.

In some cases, potential rescuers are distracted or inattentive. Thus, a simple alarm may go unnoticed.

Therefore, there is a need for a system which emits various alarm signals when an occupant is detected in a parked vehicle and the vehicle is not running.

Still further, even if help arrives in an expeditious manner, while help is on the way the occupant inside the vehicle is subject to extreme and often rising temperatures. This can be undesirable.

Therefore, there is a need for a system which protects an occupant of a parked vehicle from the effects of the hot interior while awaiting rescue.

Still further, even once help arrives, if the vehicle is locked, the help must break into the vehicle to rescue the occupant. Not only is this time-consuming, it will damage the vehicle. If a vehicle is locked, some occupants such as children or some elderly people, cannot escape from an overheated vehicle. However, some occupants may have sufficient manual dexterity to exit a vehicle if the vehicle is unlocked, but may not know how to unlock the vehicle or may become panicked or disoriented in a manner which will not allow them to be able to unlock the vehicle, but which will allow them to exit from an unlocked vehicle.

Therefore, there is a need for a system which will not only detect the presence of an occupant in a non-running vehicle, but which also will automatically unlock the vehicle.

PRINCIPAL OBJECTS OF THE INVENTION

It is a main object of the present invention to provide a safety system for a land vehicle which protects occupants in the vehicle from overheating in a parked vehicle.

It is another object of the present invention to provide a safety system for a land vehicle which protects occupants from overheating in a parked vehicle by detecting the presence of such occupants.

It is another object of the present invention to provide a safety system for a land vehicle which protects occupants from overheating in a parked vehicle and automatically activating a cooling system inside the vehicle.

It is another object of the present invention to provide a safety system for a land vehicle which protects occupants from overheating in a parked vehicle and automatically activating an alarm system.

It is another object of the present invention to provide a safety system for a land vehicle which protects occupants from overheating in a parked vehicle and automatically activating a multi-level alarm system.

It is another object of the present invention to provide a safety system for a land vehicle which protects occupants from overheating in a parked vehicle by activating a signaling system.

It is another object of the present invention to provide a safety system for a land vehicle which protects occupants from overheating in a parked vehicle and guiding help to the vehicle.

It is another object of the present invention to provide a safety system for a land vehicle which protects occupants from overheating in a parked vehicle and automatically unlocking the vehicle.

SUMMARY OF THE INVENTION

These, and other, objects are achieved by an automobile monitoring system which comprises a control unit which includes a signal receiver; a power source; the control unit being operationally connected to an engine control system of a land vehicle to be activated when the engine is turned off, the control unit being connected to the power source; a plurality of sensors located inside the vehicle; the sensors of the plurality of sensors being connected to the power supply via the control unit when the engine of the vehicle is turned off; a cooling system in the vehicle including a fluid cooling unit electrically connected to the power source and to each of the sensors of the plurality of sensors via the control unit to be activated when any sensor of the plurality of sensors detects a condition associated therewith, a fluid mover fluidically and electrically connected to the cooling unit to be activated when the fluid cooling unit is activated, a plurality of fluid conduits fluidically connected to the fluid mover and being located in the vehicle; an alarm system electrically connected to the control unit and via the control unit to each of the sensors of the plurality of sensors to be activated when a signal from a sensor is received by the control unit; the vehicle having an automatic door and storage area-locking system; and an electrical connection between the automatic door and storage area-locking system of the vehicle and the control unit, the control unit including a control circuit which causes the automatic door and storage area-locking system of the vehicle to unlock the doors and storage area of the vehicle when a signal is received by the control unit from a sensor of the plurality of sensors.

The system of the present invention thus automatically detects the presence of an occupant in a vehicle after the vehicle has been turned off. Upon detecting the presence of an occupant under such conditions, the system of the present invention automatically activates an alarm, unlocks the doors and storage areas of the vehicle and then activates a cooling system that will keep the occupant cool until help arrives. The system can also guide help to the vehicle if necessary. Once the help arrives, it would be a simple matter to remove the occupant since the doors and storage areas of the vehicle are open. Thus, an occupant left in a parked vehicle will be rescued before being harmed, and if the rescue is not immediate, that occupant will not be subjected to an unduly high temperature because the temperature in the vehicle will be moderated by the cooling system.

BRIEF DESCRIPTION OF THE DRAWING FIGURES

FIG. 1 is a schematic of a basic system embodying the present invention that protects occupants of a parked land vehicle from adverse ambient effects that may exist in the parked vehicle.

FIG. 2 shows a vehicle with the system embodying the present invention installed therein.

FIG. 3 is a schematic of a cooling system in a vehicle in conjunction with the system embodying the present invention.

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in an automobile safety system 10 which comprises a control unit 12 which includes a signal receiver 14. A power source 16, such as a battery of a vehicle V or the like, is connected via leads 18 to the control unit 12 to operate that control unit 12 when the engine of the vehicle is turned off. The control unit 12 is operationally connected to an engine control system, such as an ignition system 20, of the land vehicle to be activated when the engine is turned off.

A sensor system 30 in the vehicle includes a plurality of sensors mounted inside the vehicle proximate to occupant locations in the vehicle, the locations being selected from the group consisting of a front seat for sensor 30F, a rear seat for sensor 30R, floors for sensor 30S, and storage areas, such as a trunk or the like, for sensor 30D. Electrical leads, such as electrical lead 32, electrically connect each sensor to the power source 16 via the control unit 12. The plurality of sensors are selected from the group consisting of motion sensors 30M, force sensors 30P, heat sensors 30D, voice sensors 30V, sound sensors 3OSS and carbon dioxide sensors 30C, as well as other sensors as will occur to those skilled in the art based on the teaching of this disclosure.

Each sensor of the plurality of sensors includes a signal generator, such as signal generator 40, on sensor 30C which generates a signal upon detecting a designated condition associated with the sensor, and a signal generated by any sensor of the plurality of sensors is received by the signal receiver 14 in the control unit 12. The control unit 12 includes circuits which are activated by the signal receiver 14 to operate the system as will be understood from the teaching of this disclosure. The particular circuits will not be disclosed as those skilled in the signal art will understand what type of circuits will be required based on the teaching of this disclosure.

A cooling system 50 is included in system 10 and is located inside the vehicle, and preferably is integrated into the seats or structure of the vehicle so an occupant on the seats or in a storage area will receive the maximum benefit of the cooling system 50. The cooling system 50 includes a fluid cooling unit 52, such as an air conditioner unit commonly used on land vehicles, connected to the power source 16 via the control unit 12 by leads such as leads 54, and to the sensors via the control unit 12 and the receiver circuit therein to be activated when a signal from a sensor is received by the control unit 12. Fluid conduits, including conduit 56 and return conduit 58, are fluidically connected to the fluid cooling unit 52 to receive cooled fluid from the fluid cooling unit 52 and to return fluid to the fluid cooling unit 52. As indicated in FIG. 3, the fluid conduits are located inside the vehicle in the front seat, in the rear seat, in the floors and in the storage areas of the vehicle.

A fluid mover 60, such as a pump or the like, is electrically connected to the power source 16 and to the control unit 12 via leads 62 and fluidically connects the fluid cooling unit 52 to the fluid conduits and moves fluid through the fluid conduits to and from the fluid cooling unit 52 when the fluid cooling unit 52 is activated by the control unit 12.

An alarm system 70 is electrically connected to the control unit 12 by leads such as lead 72, and via the control unit 12 to each of the sensors to be activated when a signal from a sensor is received by the control unit 12. The alarm system 70 includes an audible alarm 74 which can emit a number of different signals such as are associated with car alarms, and is mounted on the vehicle.

In one form of the invention, alarm system 70 includes an alarm element that is located remotely from the vehicle, such as an alarm element 76 carried on a key chain by the driver of the vehicle. Alarm element 76 can be remotely activated by a signal generated by a signal generator 78 in the control unit 12 and which communicates with a signal receiver 80 in element 76 via a wireless connection. The alarm system 70 can also include a tracking system that includes a signal generator 82 in the control unit 12 that is in communication with a satellite 84 in the manner of a global positioning system with GPS circuitry 86 in the control unit 12 and a signal generating aerial unit 88 that will allow someone to track the exact location of the vehicle.

Most vehicles have an automatic door and storage area locking system 90 that is associated with the control system of the engine. It is noted that system 90 is not shown in detail because those skilled in the art will understand what it is and how it works. The exact details of the automatic locking system do not form part of this invention and thus will not be presented.

An electrical connection 92 is established between the automatic door and storage area locking system 90 of the vehicle and the control unit 12. The control unit 12 includes a control circuit 94 which causes the automatic door and storage area locking system 90 of the vehicle to unlock the doors and storage area of the vehicle when a signal is received by the control unit 12 from a sensor. As before, the exact details of the circuits mentioned herein do not form part of the invention and those skilled in the art will understand what elements must be included in such circuits based on the teaching of the present disclosure.

As soon as a sensor detects a condition, the sensor generates a signal that is received by the control unit 12. The control unit 12 then unlocks the doors and storage areas of the vehicle, and activates the alarm system 70. The control unit 12 also activates the cooling system 50. Thus, the occupant will remain cool and help will be summoned and once that help arrives, the vehicle can be quickly opened. If possible, the occupant could open a door himself since the doors will be unlocked.

It is understood that while certain forms of the present invention have been illustrated and described herein, it is not to be limited to the specific forms or arrangements of parts described and shown.

What is claimed and desired to be covered by Letters Patent is:

1. A vehicle safety system comprising:
   a) a control unit which includes a signal receiver;
   b) a power source;
   c) said control unit being operationally connected to an engine control system of a land vehicle to be activated when the engine is turned off, said control unit being connected to said power source;
   d) a sensor system in the vehicle which includes
      (1) a plurality of sensors mounted inside the vehicle proximate to occupant locations in the vehicle, the locations being selected from the group consisting of a front seat, a rear seat, floors, and storage areas,
      (2) electrical leads electrically connecting each sensor of said plurality of sensors to said power source via said control unit,
      (3) the plurality of sensors being selected from the group consisting of motion sensors, force sensors, heat sensors, voice sensors, sound sensors and carbon dioxide sensors,
      (4) the sensors of said plurality of sensors each including a signal generator which generates a signal upon detecting a designated condition associated with the sensor, and
      (5) a signal generated by any sensor of said plurality of sensors being received by the signal receiver in said control unit;
   e) a cooling system in the vehicle and including
      (1) a fluid cooling unit connected to said power source via circuitry in said control unit and to the sensors of said plurality of sensors via said control unit to be activated when a signal from a sensor of said plurality of sensors is received by said control unit,
      (2) fluid conduits fluidically connected to the fluid cooling unit to receive cooled fluid from the fluid cooling unit and conduct cooled fluid into the vehicle and to return fluid to the fluid cooling unit, the fluid conduits being located inside the vehicle in the front seat, in the rear seat, in the floors and in the storage areas of the vehicle, and
      (3) a fluid mover electrically connected to said power source and to the circuitry in said control unit and fluidically connecting the fluid cooling unit to the fluid conduits and moving fluid through the fluid conduits to and from the fluid cooling unit when the fluid cooling unit is activated;
   f) an alarm system electrically connected to circuitry in said control unit and via said control unit to each of the sensors of the plurality of sensors to be activated when a signal from a sensor is received by said control unit;
   g) the vehicle having an automatic door and storage area locking system; and
   h) an electrical connection between the automatic door and storage area locking system of the vehicle and said control unit, said control unit including a control circuit which causes the automatic door and storage area locking system of the vehicle to unlock the doors and storage area of the vehicle when a signal is received by said control unit from a sensor of the plurality of sensors.

2. The vehicle safety system as described in claim 1 further including a signaling system electrically connected to said control unit to be activated when a signal from a sensor is received by said control unit, said signaling system including a signal generator in the vehicle and a signal receiver adapted to receive signals generated by the signal generator of said signaling system, with the signal receiver of said signaling system being located remotely of the vehicle.

3. The vehicle safety system as described in claim 2 wherein said signaling system further includes a global positioning system.

4. The vehicle safety system as described in claim 3 wherein the signal receiver of said signaling system is located on a person.

5. A vehicle monitoring system comprising:
   a) a control unit which includes a signal receiver;
   b) a power source;
   c) said control unit being operationally connected to an engine control system of a land vehicle to be activated when the engine is turned off, said control unit being connected to said power source;
   d) a plurality of sensors located inside the vehicle;
   e) the sensors of said plurality of sensors being connected to said power supply via said control unit when the engine of the vehicle is turned off;
   f) a cooling system in the vehicle including
      (1) a fluid cooling unit electrically connected to said power source and to each of the sensors of said plurality of sensors via said control unit to be activated when any sensor of said plurality of sensors detects a condition associated therewith,
      (2) a fluid mover fluidically and electrically connected to said cooling unit to be activated when the fluid cooling unit is activated,
      (3) a plurality of fluid conduits fluidically connected to the fluid mover and being located in the vehicle;
   g) an alarm system electrically connected to said control unit and via said control unit to each of the sensors of the plurality of sensors to be activated when a signal from a sensor is received by said control unit; and
   h) the vehicle having an automatic door and storage area locking system; and
   i) an electrical connection between the automatic door and storage area locking system of the vehicle and said control unit, said control unit including a control circuit which causes the automatic door and storage area locking system of the vehicle to unlock the doors and storage area of the vehicle when a signal is received by said control unit from a sensor of the plurality of sensors.

* * * * *